US012744666B2

(12) United States Patent
Ikarashi

(10) Patent No.: US 12,744,666 B2
(45) Date of Patent: Sep. 22, 2026

(54) SECURE INVERSE COMPUTATION SYSTEM, SECURE NORMALIZATION SYSTEM, METHODS THEREFOR, SECURE COMPUTATION APPARATUS, AND PROGRAM

(71) Applicant: NTT, Inc., Tokyo (JP)

(72) Inventor: Dai Ikarashi, Musashino (JP)

(73) Assignee: NTT, Inc., Tokyo (JP)

( * ) Notice: Subject to any disclaimer, the term of this patent is extended or adjusted under 35 U.S.C. 154(b) by 1120 days.

(21) Appl. No.: 17/790,143

(22) PCT Filed: Jan. 20, 2020

(86) PCT No.: PCT/JP2020/001678
§ 371 (c)(1),
(2) Date: Jun. 30, 2022

(87) PCT Pub. No.: WO2021/149102
PCT Pub. Date: Jul. 29, 2021

(65) Prior Publication Data
US 2023/0344630 A1 Oct. 26, 2023

(51) Int. Cl.
*H04L 9/30* (2006.01)

(52) U.S. Cl.
CPC .................................. *H04L 9/3006* (2013.01)

(58) Field of Classification Search
CPC ... H04L 9/085; H04L 9/3006; H04L 2209/46; H03M 13/6583; G06F 7/38
See application file for complete search history.

(56) References Cited

U.S. PATENT DOCUMENTS

2019/0333415 A1 10/2019 Hamada

OTHER PUBLICATIONS

N. Attrapadung al., "Adam in Private: Secure and Fast Training of Deep Neural Networks with Adaptive Moment Estimation", 2021. (Year: 2021).*

(Continued)

*Primary Examiner* — Emily E Larocque
*Assistant Examiner* — Maria De Jesus Rivera
(74) *Attorney, Agent, or Firm* — XSENSUS LLP

(57) ABSTRACT

Normalization is performed with high precision in secure computation. A secure inverse computation system (100) receives [a] as an input and calculates [1/a]. The bit decomposition unit (11) generates a bit representation $a_0, \ldots, a_{\lambda-1}$ of a. The flag sequence generation unit (12) generates $\{x_0\}, \ldots, \{x_{\lambda-1}\}$ indicating a most significant bit of $\{a_0\}, \ldots, \{a_{\lambda-1}\}$. A bit sequence generation unit (13) generates $\{y_0\}, \ldots, \{y_{\lambda-1}\}$ in which $\{y_0\}, \{y_1\}: =\{0\}$, $\{y_i\}: =\{(\neg a_{i-2} \wedge x_{i-1})$ XOR $x_i\}$ $(2 \le i < \lambda)$, $\{y_\lambda\}: =\{\neg a_{\lambda-2} \wedge x_{\lambda-1}\}$. The normalization multiplier generation unit (14) generates [c] obtained by bit-connecting $\{y_{\lambda-1}\}, \ldots, \{y_0\}$. The normalization unit (15) calculates [b]: =[a][c].

6 Claims, 6 Drawing Sheets

(56) References Cited

OTHER PUBLICATIONS

L. Kamm et al., âSecure Floating-Point Arithmetic and Private Satellite Collision Analysisâ, 2013. (Year: 2013).*
R. Kikuchi et al., âEfficient Bit-Decomposition and Modulus Conversion Protocols with an Honest Majorityâ, 2018. (Year: 2018).*
Toomas Krips, et al., "Hybrid Model of Fixed and Floating Point Nos. in Secure Multiparty Computations", International Conference on Information Security 2014, LNCS 8783, pp. 179-197, 2014.
Octavian Catrina, et al., "Multiparty Computation of Fixed-Point Multiplication and Reciprocal", Proceedings of 2009 20th International Workshop on Database and Expert Systems Application, IEEE, Aug. 31, 2009.
Ikarashi, "Secure Real Number Operations for Secure AI-O(Ipl)-Bit Communication and O(1)-Round Right Shift Protocol-", CSS2019, 2019, 16 pages including English Translation.

* cited by examiner

SECURE INVERSE COMPUTATION SYSTEM, SECURE NORMALIZATION SYSTEM, METHODS THEREFOR, SECURE COMPUTATION APPARATUS, AND PROGRAM

CROSS-REFERENCE TO RELATED APPLICATION

The present application is based on PCT filing PCT/JP2020/001678, filed Jan. 20, 2020, the entire contents of which are incorporated herein by reference.

TECHNICAL FIELD

The present invention relates to a technology for calculating a inverse in secure computation.

BACKGROUND ART

Secure computation is a cryptographic technology for calculating any function while hiding data. A data utilization form is expected to be developed taking advantage of this feature so that data does not leak to either a system operator or a data user. There are several schemes for secure computation, and among them, the schemes including secret sharing as a component are known to have a small data processing unit and be able to perform high-speed processing.

Secret sharing is a method of converting secret information into several fragments called shares. For example, there is secret sharing called a (k, n) threshold method in which n shares are generated from the secret information and secrets can be restored from k or more shares, and thus, secret information is not leaked as long as the number of shares to restore the secret information is smaller than k. Shamir secret sharing, duplicate secret sharing, and the like are known as specific methods for configuring secret sharing. In the present specification, one fragment of a value shared by secret sharing is referred to as "share". Further, an entire set of all shares is called a "share value".

In recent years, research on advanced statistics or machine learning using secure computation has been actively performed. However, most of calculations thereof include calculations of an inverse, a square root, an exponent, a logarithm, and the like, going beyond calculations good for secure computation such as addition, subtraction, and multiplication. The calculation of the inverse is one basic calculation in a computer or the like, and is used in various situations. NPL 1 discloses a method of calculating an inverse in secure computation. Further, in various calculations of functions including an inverse, processing for performing normalization may be required so that a numerical value falls within a certain range. In the secure computation, normalization of a numerical value is performed by moving a most significant bit (msb).

CITATION LIST

Non Patent Literature

NPL 1: Dai Ikarashi, "Secure Real Number Operations for Secure AI-O(|p|)-Bit Communication and O(1)-Round Right Shift Protocol-", CSS2019, 2019

SUMMARY OF THE INVENTION

Technical Problem

However, in the related art, when normalization is performed in the secure computation, the approximation precision is not sufficient, unfortunately.

An object of the present invention is to provide a secure computation technology capable of performing normalization with high precision in view of the technical difficulty described above.

Means for Solving the Problem

In order to solve the above problems, a secure inverse computation system of a first aspect of the present invention includes a plurality of secure computation apparatuses, receives a share value [a] of a value a as an input, and calculates a share value [1/a] of the inverse of the value a. $\lambda$ is a decimal point position of the value a. Each of the plurality of secure computation apparatuses includes a bit decomposition unit configured to generate a first sequence of share values $\{a_0\}, \ldots, \{a_{\lambda-1}\}$ of a bit representation $a_0, \ldots, a_{\lambda-1}$ of the value a from the share value [a]; a flag sequence generation unit configured to generate a second sequence of share values $\{x_0\}, \ldots, \{x_{\lambda-1}\}$ of a flag sequence $x_0, \ldots, x_{\lambda-1}$ indicating a most significant bit of the first sequence of share values $\{a_0\}, \ldots, \{a_{\lambda-1}\}$; a bit sequence generation unit configured to generate a third sequence of share values $\{y_0\}, \ldots, \{y_{\lambda-1}\}$ of a bit sequence $y_0, \ldots, y_{\lambda-1}$, $\{y_0\}$ and $\{y_1\}$ being share values of 0, $\{y_2\}, \ldots, \{y_{\lambda-1}\}$ being share values of a value obtained by calculating an exclusive logical sum of a result of calculating a logical product of a logical negation of share values $\{a_{i-2}\}$ of the first sequence of share values and share values $\{x_{i-1}\}$ of the second sequence of share values, and share values $\{x_i\}$ of the second sequence of share values where i is an integer equal to or greater than 2 and smaller than $\lambda$, and $\{y_\lambda\}$ being a share value of a value obtained by calculating a logical product of a logical negation of a share value $\{a_{\lambda-2}\}$ of the first sequence of share values and a share value $\{x_{\lambda-1}\}$ of the second sequence of share values; a normalization multiplier generation unit configured to generate a share value [c] of a normalization multiplier c obtained by bit-connecting the third sequence of share values $\{y_0\}, \ldots, \{y_{\lambda-1}\}$ in reverse order, a normalization unit configured to calculate a share value [b] obtained by multiplying the share value [a] by the share value [c]; an inverse calculation unit configured to use the share value [b] to obtain a share value [w] obtained by calculating [1/b]; and an inverse normalization unit configured to calculate the share value [1/a] obtained by multiplying the share value [w] by the share value [c].

A secure normalization system of the second aspect of the present invention includes a plurality of secure computation apparatuses, and normalizes a share value [a] of a value a. $\lambda$ is a decimal point position of the value a. Each of the plurality of secure computation apparatuses includes a bit decomposition unit configured to generate a first sequence of share values $\{a_0\}, \ldots, \{a_{\lambda-1}\}$ of a bit representation $a_0, \ldots, a_{\lambda-1}$ of the value a from the share value [a]; a flag sequence generation unit configured to generate a second sequence of share values $\{x_0\}, \ldots, \{x_{\lambda-1}\}$ of a flag sequence $x_0, \ldots, x_{\lambda-1}$ indicating a most significant bit of the first sequence of share values $\{a_0\}, \ldots, \{a_{\lambda-1}\}$; a bit sequence generation unit configured to generate a third sequence of share values $\{y_0\}, \ldots, \{y_{\lambda-1}\}$ of a bit sequence $y_0, \ldots, y_{\lambda-1}$, $\{y_0\}$ and $\{y_1\}$ being share values of 0, $\{y_2\}, \ldots, \{y_{\lambda-1}\}$ being share values of a value obtained by calculating an exclusive logical sum of a result of calculating a logical product of a logical negation of share values $\{a_{i-2}\}$ of the first sequence of share values and share value $\{x_{i-1}\}$ of the second sequence of share values, and share values $\{x_i\}$ of the second sequence of share values where i is an integer equal to or greater than 2 and smaller than λ, and $\{y_\lambda\}$ being a share value of a value obtained by calculating a logical product of a logical negation of a share value $\{a_{\lambda-2}\}$ of the first sequence of share values and a share value $\{x_{\lambda-1}\}$ of the second sequence of share values; a normalization multiplier generation unit configured to generate a share value [c] of a normalization multiplier c obtained by bit-connecting the third sequence of share values $\{y_0\}, \ldots, \{y_{\lambda-1}\}$ in reverse order; and a normalization unit configured to calculate a share value [b] obtained by multiplying the share value [a] by the share value [c].

Effects of the Invention

According to the present invention, it is possible to perform normalization with high precision in secure computation.

DESCRIPTION OF EMBODIMENTS

Figure 1:
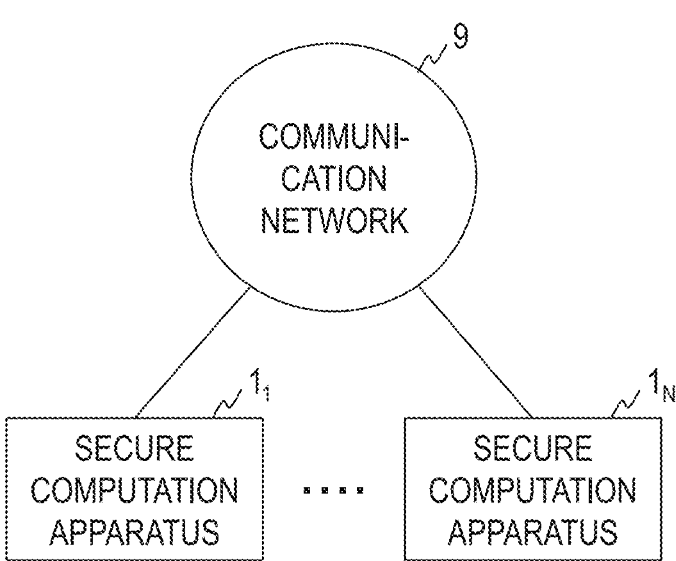
FIG. 1 is a diagram illustrating a functional configuration of a secure inverse computation system.

Hereinafter, embodiments of the present invention will be described in detail. In the drawings, components having the same function are denoted by the same numbers, and duplicate description thereof will be omitted.

In the present specification, the following notation is used.

[570 ] is data in which a numerical value ■ is hidden. For example, share values of Shamir secret sharing, duplicate secret sharing, or the like can be used.

{■} is data in which a bit ■ is hidden. For example, a share value of replication secret sharing on $Z_2$, or the like can be used.

λ denotes a decimal point position. About a half of the number |p| of bits of a ring or a field used for secure computation is assumed.

[a?b:c] represents b when a=1 and c when a=0.

$$\neg, \wedge, \vee, \oplus \quad \text{[Math. 1]}$$

Symbols described above indicate a logical negation (NOT), a logical product (AND), a logical sum (OR), and an exclusive OR (XOR), respectively.

An integer in a ring can be regarded as a fixed-point real number by setting a public decimal point position for the integer. In the present invention, the fixed-point real number represented in the ring in this way is simply referred to as a real number.

Embodiment: Secure Inverse Computation System

An embodiment of the present invention is a secure inverse computation system and method in which a share value [a] of a value a is input and a share value [1/a] of an inverse of the value a is calculated while keeping the value a concealed. Hereinafter, an overview of an inverse protocol executed by the secure inverse computation system of the embodiment will be described.

In the related art, in secure computation, a group of elementary functions such as an inverse, a square root, an exponential function, and a logarithm function that go beyond addition, subtraction, and multiplication has a high processing cost and has not been implemented. In order to solve these difficulties, the present invention enables an inverse to be efficiently calculated using an algorithm that can efficiently and uniformly approximate a group of elementary functions in the secure computation. With this approximation scheme, it is possible to approximate main elementary functions including an inverse simply by changing parameters with a single scheme. Further, this approximation scheme is an amount of communication/the number of rounds for three real number multiplications in single precision (23 bits), which is a theoretically optimized efficiency.

An inverse is an obvious component of division. A division is known as a function that has slow processing although the division is frequently used in processing for plaintext. In calculation of an inverse for plaintext, the following normalization may be performed for efficient calculation. A difference between a position of a digit of 0.5 (that is, $2^{-1}$) at a decimal point position of an input a and a most significant bit (msb) of the input a is set as e, and the following modification is performed. That is, the input a is multiplied by $2^e$ for normalization to a section [0.5, 1), and an inverse $1/\sqrt{2^e}a$ is obtained and then multiplied by $\sqrt{2^e}$.

$$\frac{1}{a} = 2^e \frac{1}{2^e a} \quad \text{[Math. 2]}$$

For the inverse, when normalization to standard [0.5, 1) is performed, a precision is about 21 bits in an eighth degree polynomial approximation. Generally, because 23-bit precision is required in single precision, it is necessary to introduce a technique for further improving the precision. Normally, a most significant bit is moved for normalization to [0.5, 1), but when a bit that is one bit below the most significant bit is 0 thereafter (that is, when a value is [0.5, 0.75)), multiplication by 1.5 is performed. Thus, [0.5, 0.75) moves to [0.75, 1.125). On the other hand, nothing is performed to [0.75, 1). As a result, normalization to [0.75, 1.125) is performed. Because [0.75, 1.125) is a section narrower than [0.5, 1) and the precision is improved as an approximation section is narrower in interpolation polynomial approximation, the above normalization is an effective technique. In fact, the technique causes the approximation precision to exceed 23 bits. On the other hand, because a processing cost required to perform the technique is a communication amount λ(≈|p|/2) and a number of rounds of about 2, the technique is more efficient than one increase in real number multiplication (communication amount 8/3*|p| and a number of rounds 3).

An algorithm for approximating a group of elementary functions in the secure computation with an eighth degree polynomial is shown hereinafter.

Algorithm 1: Function Approximation Protocol using Eighth Degree Polynomial

Input: $[x] \in [L, R)$
Parameters: a, b, c, d, f, g, H, i, j, k, l, m, n, o, p, q, α, β, γ, δ, and ζ
Output: [func (x)] corresponding to a target function func
1: Calculate [y']: $[x(\delta x+a-i)-j]$ using a sum of products, and lower a decimal point position by right shift
2: Calculate [y]: $=[y'+(ix+j]$.
3: Calculate [z']: $=[y(\zeta y+b-k)+(c-1)x-m]$ by sum of products, and lower the decimal point position by right shift.
4: Calculate [z]: $[z'+(ky+lx+m)]$.
5: Calculate [w'/γ]: $=[z(\alpha z+d-n/\gamma)+(\beta x+f-o/\gamma)y+(g-p)x+(H-q)/\gamma]$ by sum of products, and perform multiplication by γ and lowering a decimal point position at the same time to obtain [w'].
6: Output [w]: $=[w'+(nz+oy+px+q)]$.

The lowering of the decimal point position executed in steps 1 and 3 of algorithm 1 can be efficiently performed by using, for example, a public divisor division disclosed in NPL 1.

Simultaneous execution of the public value multiplication and lowering of the decimal point executed in step 5 of algorithm 1 can be efficiently performed by using, for example, the following algorithm.

Algorithm 2: Multiplication of Public Value at Same Time without Increasing Processing Cost from Right Shift Input: [x], multiplier m, shift amount σ
Output: [mx] after shift
1: Calculate a public value $2^\sigma/m$.
2: Calculate the following equation through public value division. Here, [mx] is regarded as an expression the decimal point position of which is σ lower than that of [x].

$$\frac{[x]}{\frac{2^\sigma}{m}} = [mx] \quad \text{[Math. 3]}$$

Parameters L, R, a, b, c, d, f, g, H, i, j, k, l, m, n, o, p, q, α, β, γ, δ, and ζ used in algorithm 1 are set according to the approximate function func. When an inverse function, which is a target in the present invention, is approximated, the respective parameters are set as shown in the following table, for example. Note that $e_x$, $e_y$, $e_z$, and $e_w$ are decimal point positions of x, y, z, and w, and $e'_y$, $e'_z$, and $e'_w$ are decimal point positions of y', z', and w'. These are parameters that determine an amount of right shift in eighth degree polynomial approximation. For example, the amount of right shift when y is calculated from y' is $e'_y-e_y$.

TABLE 1

| | |
|---|---|
| L | 0.75 |
| R | 1.125 |
| a | −2.11046439323928 |
| b | 2.43496077969272 |
| c | −0.184132172881249 |
| d | 9.88993287969575 |
| f | 1.84381323555315 |
| g | −2.07484418278256 |

TABLE 1-continued

| | |
|---|---|
| H | 9.79270035795559 |
| i | 0 |
| j | −1.11351498878271 |
| k | 1 |
| l | 0 |
| m | −0.56891514130653 |
| n | 16 |
| o | −4 |
| p | 2 |
| q | 11.2420887457771 |
| α | 2.6875 |
| β | −0.90625 |
| $\gamma^{-1}$ | 1.37871439910087 |
| δ | 1 |
| ζ | 1 |
| $e_x$ | 28 |
| $e_y$ | 29 |
| $e_z$ | 29 |
| $e_w$ | 27 |
| $e'_y$ | 61 |
| $e'_z$ | 63 |
| $e'_w$ | 63 |

An algorithm for calculating an inverse in the secure computation using algorithm 1 is shown hereafter. Here, an algorithm for normalizing an input, which is a calculation target, for calculation of an inverse (algorithm 3) and an algorithm for calculating the inverse using algorithm 3 (algorithm 4) will be described separately.

Algorithm 3: Normalization Protocol for Inverse

Input: [a]
Output: [b] and [c] (here, b is a value obtained by moving a most significant bit of a to a decimal point position λ and then performing multiplication by 1.5 when a bit that is a bit below the most significant bit of a is 0 (that is, a value obtained by normalizing a to [0.75, 1.125) when the decimal point position is λ+1); c is a number of a power of 2 that is used for normalization and an inverse operation thereof, and satisfies b=ac).
1: Obtain a bit representation $\{a_0\}, \ldots, \{a_{\lambda-1}\}$ of [a] through bit decomposition.
2: Obtain a bit sequence $\{x_0\}, \ldots, \{x_{\lambda-1}\}$ in which only the value at a position of the most significant bit of a is 1.
3: Set $\{y_i\}$ according to the following equation, with $2 \le i \le \lambda$.

$$\{y_i\} := \{(\neg a_{i-2} \wedge x_{i-1}) \oplus x_i\} \quad \text{[Math. 4]}$$

4: Set $\{y_0\}$, $\{y_1\}$, and $\{y_\lambda\}$ according to the following equation.

$$\{y_0\} := \{y_\lambda\} := \{0\} \quad \text{[Math. 5]}$$

$$\{y_\lambda\} := \{\neg a_{\lambda-2} \wedge x_{\lambda-2}\}$$

When an input bit that is one bit below msb is 1, $y_i$ that is one bit above msb becomes 1. $y_i$ is set upside down because upside-down and connection are performed in the next step.
5: Connect $\{y_{\lambda-1}\}, \ldots, \{y_0\}$ through bit combination to obtain [c].

c becomes a value multiplied by 1.5 when msb of a is moved to a defined position and a bit that is one bit below msb is 0. It is to be noted that a fixed decimal point in which a decimal point position is 1 is used.

6: Calculate [b]: =[a][c] and output [b] and [c].

Algorithm 4: Inverse Protocol

Input: [a]

Output: [1/a]

1: Obtain the value [b] obtained by normalizing [a] to [0.75, 1.125) using algorithm 3, and the value [c] multiplied for the normalization.

2: Execute algorithm 1 for [b] and calculate an inverse of [b]. A result is [w].

3: Calculate [w][c].

The generation of the flag sequence indicating the most significant bit executed in step 2 of algorithm 3 can be efficiently performed by using, for example, the following algorithm.

Algorithm 5: MSB Flag Sequence Acquisition Protocol

Input: Bit-represented integer $\{a_0\}, \ldots, \{a_{\lambda-1}\}$

Output: Bit sequence $\{x_0\}, \ldots, \{x_{\lambda-1}\}$ in which only the value at the position of the msb of a is 1.

1: Under $0 \le i < \lambda-1$, assume $\{f_i\}: =\{f_{i+1} \vee a_i\}$.

2: Assume $\{f_{\lambda-1}\}: =\{a_{\lambda-1}\}$. Here, $\{f_0\}, \ldots, \{f_{\lambda-1}\}$ is a bit sequence in which 0s and 1s are lined up with msb as a boundary, such as 0, 0, 0, 1, 1, 1, . . . , 1.

3: Set $\{x_i\}: =\{f_i \text{ XOR } f_{i+1}\}$ with $0 \le i < \lambda-1$.

4: Assume $\{x_{\lambda-1}\}: =\{a_{\lambda-1}\}$. Here, $\{x_0\}, \ldots, \{x_{\lambda-1}\}$ is a bit sequence in which only the value at the position of msb is 1, such as 0, 0, 0, 1, 0, 0, . . . , 0.

Secure Inverse Computation System 100

The secure inverse computation system 100 of the embodiment is an information processing system that executes the above inverse protocol. The secure inverse computation system 100 includes N (≥3) secure computation apparatuses $\mathbf{1}_1, \ldots, \mathbf{1}_N$, as illustrated in FIG. 1. In this embodiment, the secure computation apparatuses $\mathbf{1}_1, \ldots, \mathbf{1}_N$ are connected to a communication network 9. The communication network 9 is a circuit-switched or packet-switched communication network configured so that respective connected apparatuses can communicate with each other. As the communication network, for example, the Internet, a local area network (LAN), a wide area network (WAN), or the like can be used. It is not necessary for each apparatus to be able to communicate online via the communication network 9. For example, each apparatus may be configured so that information to be input to a secure computation apparatus $\mathbf{1}_n$ (n=1, . . . , N) is stored in a portable recording medium such as a magnetic tape or a USB memory and input offline from the portable recording medium to the secure computation apparatus $\mathbf{1}_n$.

Figure 2:
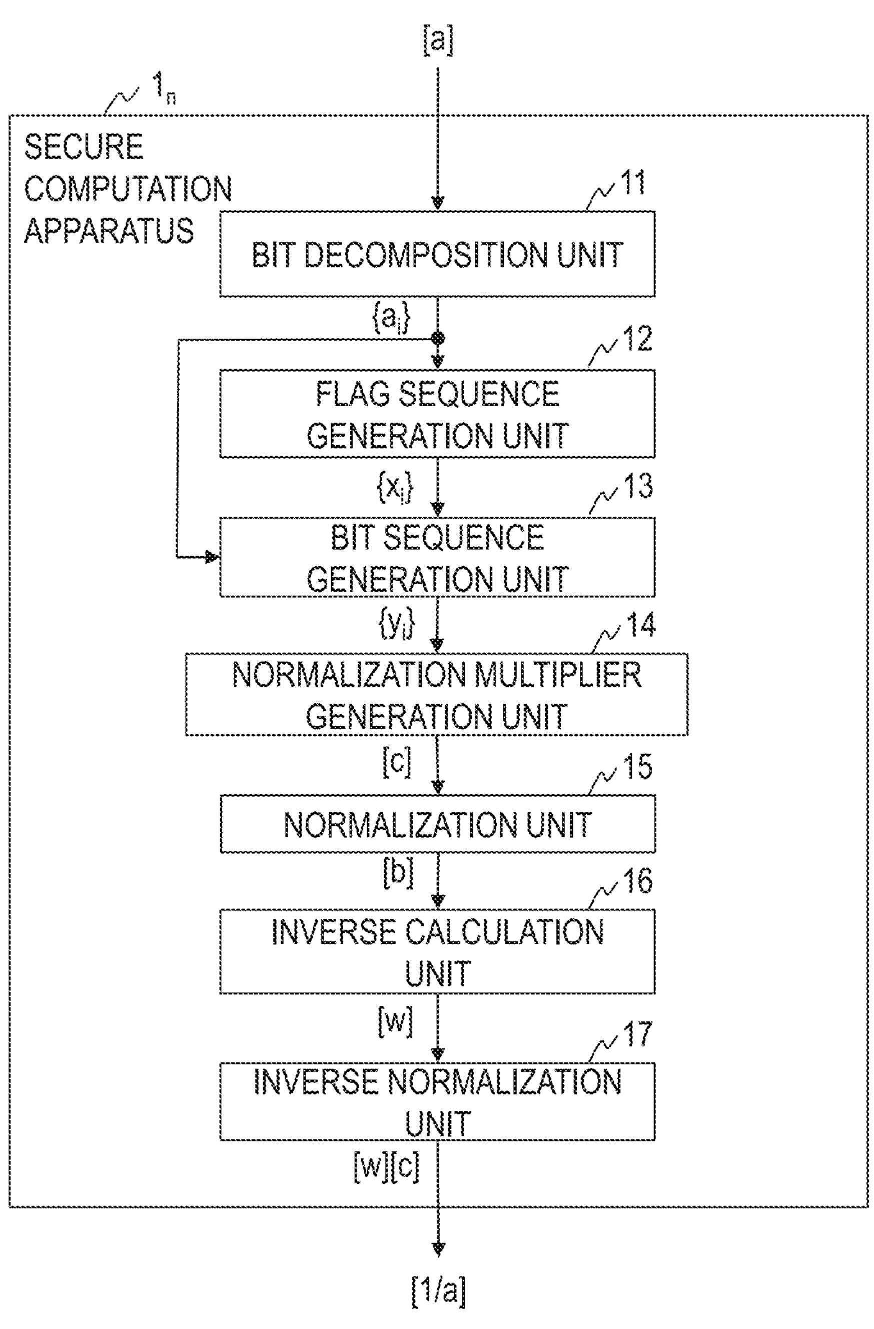
FIG. 2 is a diagram illustrating a functional configuration of a secure computation apparatus.
Figure 3:
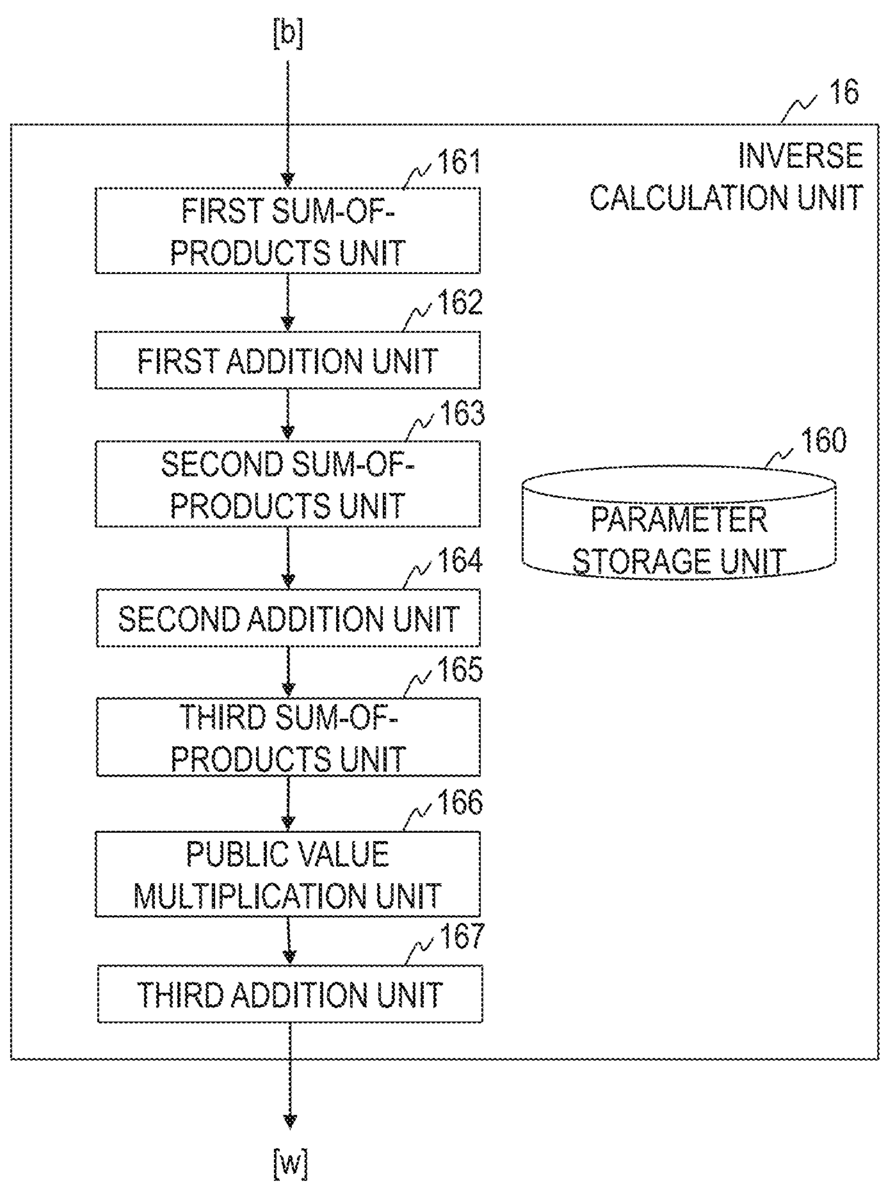
FIG. 3 is a diagram illustrating a functional configuration of an inverse calculation unit.

The secure computation apparatus $\mathbf{1}_n$ included in the secure inverse computation system 100 of the embodiment includes, for example, a bit decomposition unit 11, a flag sequence generation unit 12, a bit sequence generation unit 13, a normalization multiplier generation unit 14, a normalization unit 15, an inverse calculation unit 16, and an inverse normalization unit 17, as illustrated in FIG. 2. The inverse calculation unit 16 includes, for example, a parameter storage unit 160, a first sum-of-products unit 161, a first addition unit 162, a second sum-of-products unit 163, a second addition unit 164, a third sum-of-products unit 165, a public value multiplication unit 166, and a third addition unit 167, as illustrated in FIG. 3. A secure inverse computation method of the embodiment is realized by the secure computation apparatus $\mathbf{1}_n$ performing processing of each step to be described below in cooperation with another secure computation apparatus $\mathbf{1}_{n'}$ (n'=1, . . . , N, where n≠n').

The secure computation apparatus $\mathbf{1}_n$ is a special apparatus configured by loading a special program into a publicly known or dedicated computer including, for example, a central processing unit (CPU), a main storage device (RAM: Random Access Memory), and the like. The secure computation apparatus $\mathbf{1}_n$ executes each process under the control of the central processing unit, for example. Data input to the secure computation apparatus $\mathbf{1}_n$ or data obtained by each processing is stored in, for example, the main storage device, and the data stored in the main storage device is read to the central processing unit as needed, and used for other processing. At least a part of each processing unit of the secure computation apparatus $\mathbf{1}_n$ may be configured by hardware such as an integrated circuit. Each storage unit included in the secure computation apparatus $\mathbf{1}_n$ can be configured of, for example, a main storage device such as a random access memory (RAM), an auxiliary storage device configured of a hard disk, an optical disc, or a semiconductor memory element such as a flash memory, or middleware such as a relational database or a key value store.

Figure 4:
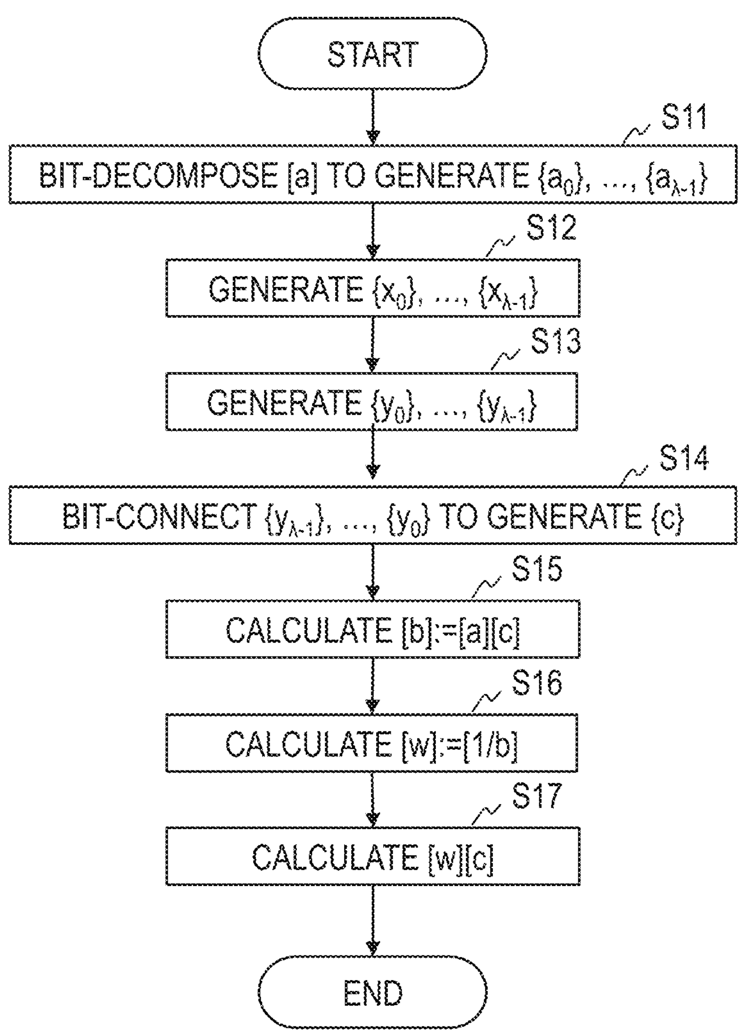
FIG. 4 is a diagram illustrating a processing procedure of a secure inverse computation method.

A processing procedure of the secure inverse computation method executed by the secure inverse computation system 100 of the embodiment will be described with reference to FIG. 4.

In step S11, the bit decomposition unit 11 of each secure computation apparatus $\mathbf{1}_n$ bit-decomposes the share value [a] of the value a input to the secure inverse computation system 100 to obtain a sequence of share values $\{a_0\}, \ldots, \{a_{\lambda-1}\}$ of a bit representation of the value a. The bit decomposition unit 11 outputs a sequence of share values $\{a_0\}, \ldots, \{a_{\lambda-1}\}$ to the flag sequence generation unit 12 and the bit sequence generation unit 13.

In step S12, the flag sequence generation unit 12 of each secure computation apparatus $\mathbf{1}_n$ uses the sequence of share values $\{a_0\}, \ldots, \{a_{\lambda-1}\}$ to generate a sequence of share values $\{x_0\}, \ldots, \{x_{\lambda-1}\}$ of a flag sequence $x_0, \ldots, x_{\lambda-1}$ indicating a most significant bit of the value a. The flag sequence indicating the most significant bit is, for example, a flag sequence in which only the value at the position of the most significant bit obtained by using the above algorithm 5 is 1. The flag sequence generation unit 12 outputs the sequence of share values $\{x_0\}, \ldots, \{x_{\lambda-1}\}$ to the bit sequence generation unit 13.

In step S13, the bit sequence generation unit 13 of each secure computation apparatus $\mathbf{1}_n$ uses the sequence of share values $\{a_0\}, \ldots, \{a_{\lambda-1}\}$ and the sequence of share values $\{x_0\}, \ldots, \{x_{\lambda-1}\}$ to generate a sequence of share values $\{y_0\}, \ldots, \{y_{\lambda-1}\}$ of a bit sequence $y_0, \ldots, y_{\lambda-1}$. Specifically, first, set $\{y_0\}$ and $\{y_1\}$ to $\{0\}$. Then, calculate $\{y_i\}: =\{(\neg a_{i-2} \wedge x_{i-1}) \text{ XOR } x_i\}$ for each integer i equal to or greater than 2 and smaller than λ. That is, $\{y_2\}, \ldots, \{y_{\lambda-1}\}$ is a result of calculating a logical product of a logical negation of the share value $\{a_{i-2}\}$ and the share value $\{x_{i-1}\}$ and calculating an exclusive logical sum of a result thereof and the share value $\{x_i\}$. Then, calculate $\{y_\lambda\}: =\{\neg a_{\lambda-2} \wedge x_{\lambda-1}\}$. That is, $\{y_\lambda\}$ is a result of calculating a logical product of a logical negation of the share value $\{a_{\lambda-2}\}$ and the share value $\{x_{\lambda-1}\}$. The bit sequence generation unit 13 outputs a sequence of share values $\{y_0\}, \ldots, \{y_{\lambda-1}\}$ to the normalization multiplier generation unit 14.

In step S14, the normalization multiplier generation unit 14 of each secure computation apparatus $\mathbf{1}_n$ bit-connects the sequence of share values $\{y_0\}, \ldots, \{y_{\lambda-1}\}$ in reverse order to generate a share value [c] of a multiplier c (hereinafter also referred to as a "normalization multiplier") by which a calculation result is multiplied in order to perform normalization and an inverse operation thereof. The normalization multiplier generation unit 14 outputs the share value [c] to the normalization unit 15.

In step S15, the normalization unit 15 of each secure computation apparatus $\mathbf{1}_n$ multiplies the share value [a] of the value a by the share value [c] of the normalization multiplier c to calculate a share value [b] of a value b obtained by normalizing the value a. The normalization unit 15 outputs the share value [b] to the inverse calculation unit 16.

In step S16, the inverse calculation unit 16 of each secure computation apparatus $\mathbf{1}_n$ uses parameters for approximating an inverse function with an eighth degree polynomial to execute algorithm 1 so that the inverse is calculated for the share value [b] of the value b, and generates the share value [w] of the calculation result w. The inverse calculation unit 16 outputs the share value [w] to the inverse normalization unit 17.

In step S17, the inverse normalization unit 17 of each secure computation apparatus $\mathbf{1}_n$ multiplies the share value [w] of the calculation result w by the share value [c] of the normalization multiplier c to output a share value [1/a] of the inverse of the value a.

Figure 5:
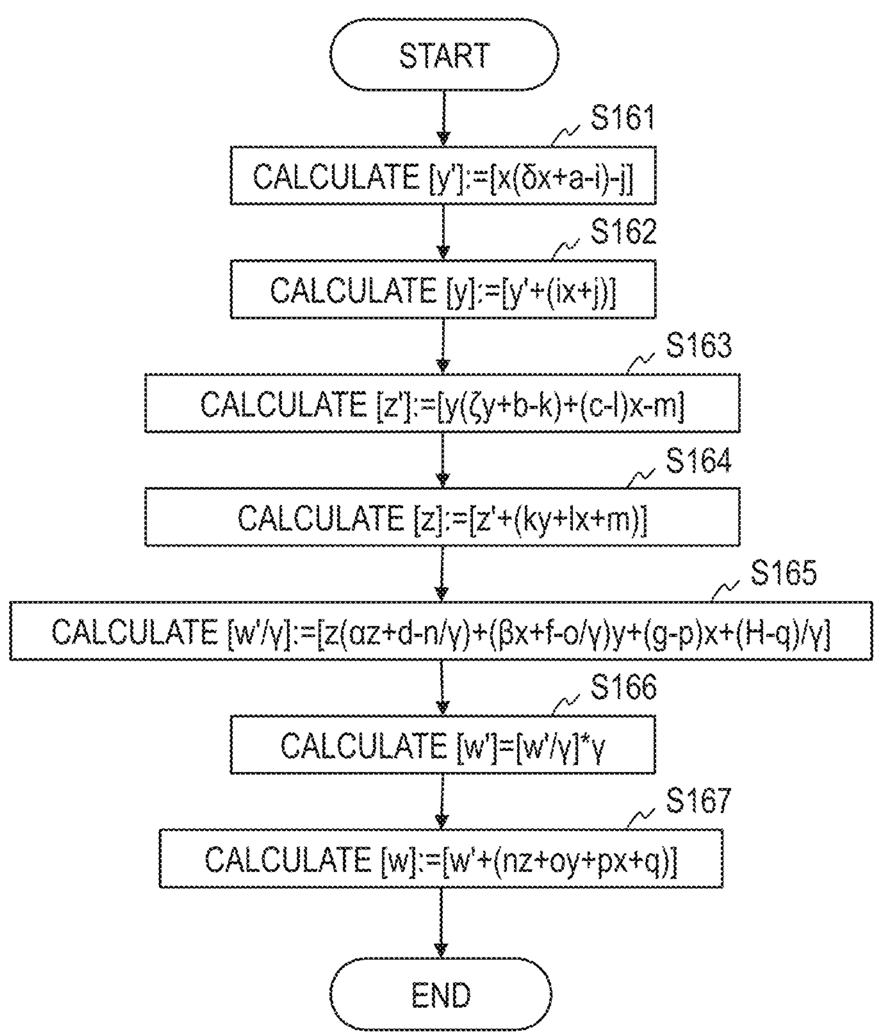
FIG. 5 is a diagram illustrating a processing procedure of an inverse calculation unit.

A processing procedure executed by the inverse calculation unit 16 will be described in detail with reference to FIG. 5.

Parameters a, b, c, d, f, g, H, i, j, k, l, m, n, o, p, q, $\alpha$, $\beta$, $\gamma$, $\delta$, and $\zeta$ for approximating the inverse function with an eighth degree polynomial are stored in the parameter storage unit 160. Each parameter is determined in advance according to a function to be approximated, and when the inverse function is approximated, values shown in Table 1 are set.

In step S161, the first sum-of-products unit 161 of the inverse calculation unit 16 calculates [y']: =[x(δx+a−i)−j] through a sum of products, and lowers a decimal point position through right shift. Here, x is an value b obtained by normalizing the value a. That is, [x]: =[b]. The first sum-of-product unit 161 outputs [y'] to the first addition unit 162.

In step S162, the first addition unit 162 of the inverse calculation unit 16 calculates [y]: =[y'+(ix+j)]. The first addition unit 162 outputs [y] to the second sum-of-products unit 163.

In step S163, the second sum-of-products unit 163 of the inverse calculation unit 16 calculates [z']: =[y(ζy+b−k)+(c−l)x−m] through a sum of products, and lowers a decimal point position through right shift. The second sum-of-product unit 163 outputs [z'] to the second addition unit 164.

In step S164, the second addition unit 164 of the inverse calculation unit 16 calculates [z]: =[z'+(ky+lx+m)]. The second addition unit 164 outputs [z] to the third sum-of-products unit 165.

In step S165, the third sum-of-products unit 165 of the inverse calculation unit 16 calculates [w'/γ]: [z(αz+d−n/γ)+(βx+f−o/γ)y+(g−p)x+(H−q)/γ] through a sum of products. The third sum-of-product unit 165 outputs [w'/γ] to the public value multiplication unit 166.

In step S166, the public value multiplication unit 166 of the inverse calculation unit 16 calculates [w']: =[w'/γ]*γ. The public value multiplication unit 166 outputs [w'] to the third addition unit 167.

In step S167, the third addition unit 167 of the inverse calculation unit 16 calculates [w]: =[w'+(nz+oy+px+q)].

Modification Example: Secure Normalization System

The secure inverse computation system 100 of the embodiment is configured to execute both normalization for inverse calculation (algorithm 3) and inverse calculation (algorithm 4). A secure normalization system of the modification example is configured to execute only a part of the secure inverse computation system 100 that performs normalization (algorithm 3) for inverse calculation. That is, the secure normalization system receives a share value [a] of a value a as an input, and outputs a share value [b] of a value b obtained by normalizing the value a to [0.75, 1.125), and a share value [c] of a normalization multiplier c. Specifically, the secure computation apparatus $\mathbf{1}_n$ included in the secure normalization system of the modification example includes a bit decomposition unit 11, a flag sequence generation unit 12, a bit sequence generation unit 13, a normalization multiplier generation unit 14, and a normalization unit 15. It is conceivable that this normalization algorithm be used to execute various functions. Therefore, the secure normalization system of the modification example is not limited to a configuration for the purpose of inverse calculation.

Although the embodiments of the present invention have been described above, a specific configuration is not limited to these embodiments and it is obvious that even if a design were appropriately changed without departing from the spirit of the present invention, such changes would be included in the present invention. Various processing described in the embodiments may be not only executed in chronological order according to order of description, but may also be executed in parallel or individually according to a processing capacity of an apparatus that executes processing or as necessary.

Program and Recording Medium

Figure 6:
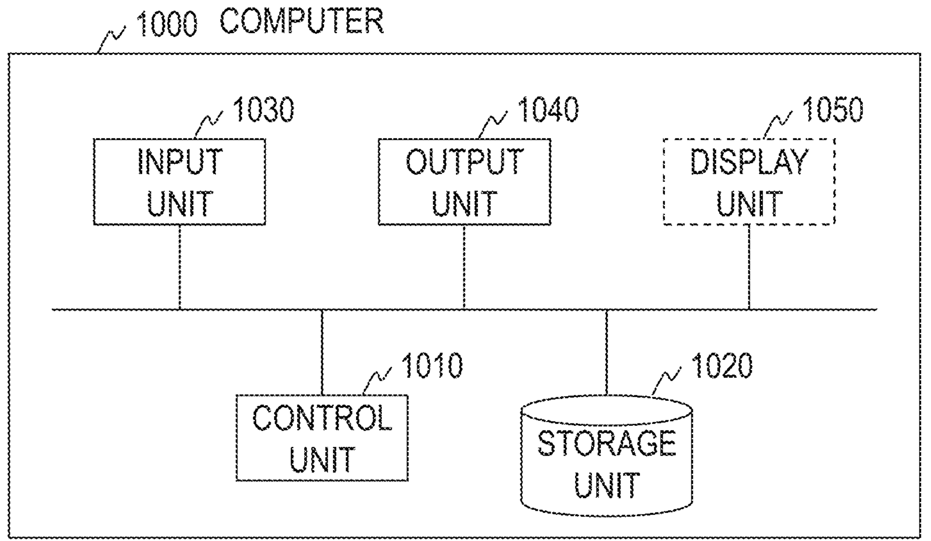
FIG. 6 is a diagram illustrating a functional configuration of a computer.

When various processing functions in each apparatus described in the above embodiment are realized by a computer, processing content of the function to be included in each apparatus is described by a program. This program is loaded into a storage unit 1020 of a computer illustrated in FIG. 6 and a control unit 1010, an input unit 1030, an output unit 1040, and the like are operated according to the program so that various processing functions in each of the above apparatuses are realized on the computer.

A program in which processing content thereof has been described can be recorded on a computer-readable recording medium. The computer-readable recording medium may be, for example, a magnetic recording device, an optical disc, a magneto-optical recording medium, or a semiconductor memory.

Further, distribution of this program is performed, for example, by selling, transferring, or renting a portable recording medium such as a DVD or CD-ROM on which the program has been recorded. Further, the program may be distributed by being stored in a storage device of a server computer and transferred from the server computer to another computer via a network.

The computer that executes such a program first temporarily stores, for example, the program recorded on the portable recording medium or the program transferred from the server computer in a storage device of the computer. When the computer executes the processing, the computer reads the program stored in the recording median of the computer and executes processing according to the read program. Further, as another embodiment of the program, the computer may directly read the program from the portable recording medium and execute the processing according to the program, and further, processing according to a received program may be sequentially executed each time the program is transferred from the server computer to the computer. Further, a configuration may be adopted in which the above-described processing is executed by a so-called application service provider (ASP) type service for realizing a processing function according to only an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

Further, in this embodiment, although the present apparatus is configured by a predetermined program being executed on the computer, at least a part of processing content of thereof may be realized by hardware.

The invention claimed is:

1. A secure inverse computation system for receiving a share value [a] of a value a as an input, and calculating a share value [1/a] of the inverse of the value a, the secure inverse computation system comprising:

a plurality of secure computation apparatuses, wherein $\lambda$ is a decimal point position of the value a, and each secure computation apparatus of the plurality of secure computation apparatuses comprises processing circuitry configured to:

generate, in cooperation with others of the plurality of secure computation apparatuses via communications including transmitting and receiving data over a network, a first sequence of share values $\{a_0\}, \ldots, \{a_{\lambda-1}\}$ of a bit representation $a_0, \ldots, a_{\lambda-1}$ of the value a from the share value [a];

generate, in cooperation with others of the plurality of secure computation apparatuses via communications including transmitting and receiving data over the network, a second sequence of share values $\{x_0\}, \ldots, \{x_{\lambda-1}\}$ of a flag sequence $x_0, \ldots, x_{\lambda-1}$ indicating a most significant bit of the first sequence of share values $\{a_0\}, \ldots, \{a_{\lambda-1}\}$;

generate, in cooperation with others of the plurality of secure computation apparatuses via communications including transmitting and receiving data over the network, a third sequence of share values $\{y_0\}, \ldots, \{y_{\lambda-1}\}$ of a bit sequence $y_0, \ldots, y_{\lambda-1}$, $\{y_0\}$ and $\{y_1\}$ being share values of 0, $\{y_2\}, \ldots, \{y_{\lambda-1}\}$ being share values of a value obtained by calculating an exclusive logical sum of a result of calculating a logical product of a logical negation of share values $\{a_{i-2}\}$ of the first sequence of share values and share values $\{x_{i-1}\}$ of the second sequence of share values, and share values $\{x_i\}$ of the second sequence of share values where i is an integer equal to or greater than 2 and smaller than $\lambda$, and $\{y_\lambda\}$ being a share value of a value obtained by calculating a logical product of a logical negation of a share value $\{a_{\lambda-2}\}$ of the first sequence of share values and a share value $\{x_{\lambda-1}\}$ of the second sequence of share values;

generate, in cooperation with others of the plurality of secure computation apparatuses via communications including transmitting and receiving data over the network, a share value [c] of a normalization multiplier c obtained by bit-connecting the third sequence of share values $\{y_0\}, \ldots, \{y_{\lambda-1}\}$ in reverse order;

calculate, in cooperation with others of the plurality of secure computation apparatuses via communications including transmitting and receiving data over the network, a share value [b] obtained by multiplying the share value [a] by the share value [c];

obtain a share value [w] by calculating [1/b], in cooperation with others of the plurality of secure computation apparatuses via communications including transmitting and receiving data over the network, using the share value [b]; and calculate, in cooperation with others of the plurality of secure computation apparatuses via communications including transmitting and receiving data over the network, the share value [1/a] obtained by multiplying the share value [w] by the share value [c].

2. The secure inverse computation system according to claim 1, wherein a, b, c, d, f, g, H, i, j, k, l, m, n, o, p, q, $\alpha$, $\beta$, $\gamma$, $\delta$, and $\zeta$ are parameters for approximating an inverse function with an eighth degree polynomial, and [x]: =[b] is assumed, and the processing circuitry further configured to:

calculate [y']: $=[x(\delta x+a-i)-j]$;

calculate [y]: $=[y'+(ix+j)]$;

calculate [z']: $=[y(\zeta y+b-k)+(c-1)x-m]$;

calculate [z]: $=[z'+(ky+lx+m)]$;

calculate [w'/γ]: $=[z(\alpha z+d-n/\gamma)+(\beta x+f-o/\gamma)y+(g-p)x+(H-q)/\gamma]$;

calculate [w']: $=[w'/\gamma]*\gamma$; and calculate [w]: $=[w'+(nz+op+px+q)]$.

3. A secure normalization system for normalizing a share value [a] of a value a, the secure normalization system comprising:

a plurality of secure computation apparatuses, wherein $\lambda$ is a decimal point position of the value a, and each secure computation apparatus of the plurality of secure computation apparatuses comprises processing circuitry configured to:

generate, in cooperation with others of the plurality of secure computation apparatuses via communications including transmitting and receiving data over a network, a first sequence of share values $\{a_0\}, \ldots, \{a_{\lambda-1}\}$ of a bit representation $a_0, \ldots, a_{\lambda-1}$ of the value a from the share value [a];

generate, in cooperation with others of the plurality of secure computation apparatuses via communications including transmitting and receiving data over the network, a second sequence of share values $\{x_0\}, \ldots, \{x_{\lambda-1}\}$ of a flag sequence $x_0, \ldots, x_{\lambda-1}$ indicating a most significant bit of the first sequence of share values $\{a_0\}, \ldots, \{a_{\lambda-1}\}$;

generate, in cooperation with others of the plurality of secure computation apparatuses via communications including transmitting and receiving data over the network, a third sequence of share values $\{y_0\}, \ldots, \{y_{\lambda-1}\}$ of a bit sequence $y_0, \ldots, y_{\lambda-1}$, $\{y_0\}$ and $\{y_1\}$ being share values of 0, $\{y_2\}, \ldots, \{y_{\lambda-1}\}$ being share values of a value obtained by calculating an exclusive logical sum of a result of calculating a logical product of a logical negation of share values $\{a_{i-2}\}$ of the first sequence of share values and share value $\{x_{i-1}\}$ of the second sequence of share values, and share values $\{x_i\}$ of the second sequence of share values where i is an integer equal to or greater than 2 and smaller than $\lambda$, and $\{y_\lambda\}$ being a share value of a value obtained by calculating a logical product of a logical negation of a share value $\{a_{\lambda-2}\}$ of the first sequence of share values and a share value $\{x_{\lambda-1}\}$ of the second sequence of share values;

generate, in cooperation with others of the plurality of secure computation apparatuses via communications including transmitting and receiving data over the network, a share value [c] of a normalization multiplier c obtained by bit-connecting the third sequence of share values $\{y_0\}, \ldots, \{y_{\lambda-1}\}$ in reverse order; and calculate, in cooperation with others of the plurality of secure computation apparatuses via communications including transmitting and receiving data over the network, a share value [b] obtained by multiplying the share value [a] by the share value [c].

4. A secure inverse computation method executed by a secure inverse computation system for receiving a share value [a] of a value a as an input, and calculating a share value [1/a] of the inverse of the value a, the secure inverse computation system including a plurality of secure computation apparatuses, the secure inverse computation method comprising:

generating, by processing circuitry of each secure computation apparatus of the plurality of secure computation apparatuses in cooperation with others of the plurality of secure computation apparatuses via communications including transmitting and receiving data over a network, a first sequence of share values $\{a_0\}, \ldots, \{a_{\lambda-1}\}$ of a bit representation $a_0, \ldots, a_{\lambda-1}$ of the value a from the share value [a];

generating, by the processing circuitry of each secure computation apparatus of the plurality of secure computation apparatuses in cooperation with others of the plurality of secure computation apparatuses via communications including transmitting and receiving data over the network, a second sequence of share values $\{x_0\}, \ldots, \{x_{\lambda-1}\}$ of a flag sequence $x_0, \ldots, x_{\lambda-1}$ indicating a most significant bit of the first sequence of share values $\{a_0\}, \ldots, \{a_{\lambda-1}\}$;

generating, by the processing circuitry of each secure computation apparatus of the plurality of secure computation apparatuses in cooperation with others of the plurality of secure computation apparatuses via communications including transmitting and receiving data over the network, a third sequence of share values $\{y_0\}, \ldots, \{y_{\lambda-1}\}$ of a bit sequence $y_0, \ldots, y_{\lambda-1}$, $\{y_0\}$ and $\{y_1\}$ being share values of 0, $\{y_2\}, \ldots, \{y_{\lambda-1}\}$ being share values of a value obtained by calculating an exclusive logical sum of a result of calculating a logical product of a logical negation of share values $\{a_{i-2}\}$ of the first sequence of share values and share values $\{x_{i-1}\}$ of the second sequence of share values, and share values $\{x_i\}$ of the second sequence of share values where i as an integer equal to or greater than 2 and smaller than $\lambda$, and $\{y_\lambda\}$ being a share value of a value obtained by calculating a logical product of a logical negation of a share value $\{a_{\lambda-2}\}$ of the first sequence of share values and a share value $\{x_{\lambda-1}\}$ of the second sequence of share values;

generating, by the processing circuitry of each secure computation apparatus of the plurality of secure computation apparatuses in cooperation with others of the plurality of secure computation apparatuses via communications including transmitting and receiving data over the network, a share value [c] of a normalization multiplier c obtained by bit-connecting the third sequence of share values $\{y_0\}, \ldots, \{y_{\lambda-1}\}$ in reverse order;

calculating, by the processing circuitry of each secure computation apparatus of the plurality of secure computation apparatuses in cooperation with others of the plurality of secure computation apparatuses via communications including transmitting and receiving data over the network, a share value [b] obtained by multiplying the share value [a] by the share value [c];

obtaining a share value [w] by calculating [1/b], by the processing circuitry of each secure computation apparatus of the plurality of secure computation apparatuses in cooperation with others of the plurality of secure computation apparatuses via communications including transmitting and receiving data over the network, using the share value [b]; and calculating, by the processing circuitry of each secure computation apparatus of the plurality of secure computation apparatuses in cooperation with others of the plurality of secure computation apparatuses via communications including transmitting and receiving data over the network, the share value [1/a] obtained by multiplying the share value [w] by the share value [c], wherein $\lambda$ is a decimal point position of the value a.

5. A non-transitory computer recording medium storing computer executable instructions which, when executed by the plurality of secure computation apparatus, cause the plurality of secure computation apparatuses to perform the secure inverse computation method of claim 4.

6. The secure inverse computation system of claim 1, wherein the value a is kept concealed from each secure computation apparatus of the plurality of secure computation apparatuses during the cooperation.

* * * * *